United States Patent

Sassa et al.

[15] 3,697,566
[45] Oct. 10, 1972

[54] NOVEL ORGANO-TIN COMPOUNDS

[72] Inventors: Atsuo Sassa, Tokyo; Masuo Yukutomi, Fuchu-shi; Hirotoshi Shinkawa, Musashino-shi; Tuneo Moriya, Otsu-shi; Keisuke Homma, Itami-shi, all of Japan

[73] Assignees: Kyodo Chemical Company Limited; Sumitoma Bakelite Company Limited, Tokyo, Japan

[22] Filed: Nov. 24, 1969

[21] Appl. No.: 879,592

[30] Foreign Application Priority Data

Nov. 30, 1968   Japan ..................... 43/87293
Nov. 30, 1968   Japan ..................... 43/87294
Nov. 30, 1968   Japan ..................... 43/87295

[52] U.S. Cl. .................... 260/429.7, 260/45.75 K
[51] Int. Cl. ............................................. C07f 7/22
[58] Field of Search ............................ 260/429.7

[56] References Cited

UNITED STATES PATENTS 3,396,185  8/1968  Hechenbleikner et al. ............ 260/429.7
3,478,071  11/1969  Weisfeld .................. 260/429.7

Primary Examiner—Tobias E. Levow
Assistant Examiner—Werton F. W. Bellamy
Attorney—Karl W. Flocks

[57] ABSTRACT

An organo-tin compound is prepared by reacting a compound having the following general formula:

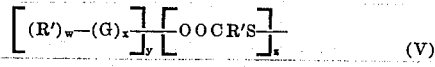

or $(R-Sn(A)_{1.5})_l$  (II)

wherein R represents an alkyl group, alkenyl group or aralkyl group having one to eighteen carbon atoms, A represents a sulfur atom and $l$ represents a mean degree of polymerization of any number of at least 2, with a monoorgano-tin compound having the following general formula:

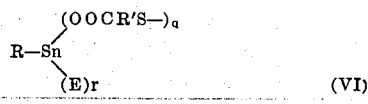

wherein R has the same meaning as defined above, SX represents a group of mercaptan residue, or a group of the following general formula:

—SR'COOR"  [IV]

(wherein R' represents an alkylene group, cycloalkylene group, alkenylene group and phenylene group having one to eight carbon atoms, R" represents a hydrogen atom or an alkyl group, cycloalkyl group, alkenyl group or aralkyl group), SY represents a group of said SX or a group of the following general formula:

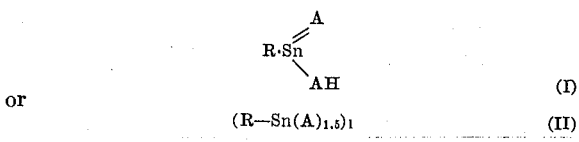

(wherein R' has the same meaning as defined above, G represents an oxygen atom, sulfur atom, carbon atom or a methylidyne group, w represents an integer of 1 to 4, x represents an integer of 0 or 1, y represents an integer of 1 to 8 and z represents an integer of 2 to 4) or a group of the following general formula:

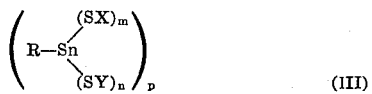

(wherein R has the same meaning as defined above, E represents a group of said SX or a group of the general formula [V], q represents an integer of 1 to 3 and r represents an integer of 1 or 2), m and n represents integers, where $m + n = 3$, and p represents a mean degree of polymerization of any number of at least 1, or compounds having the general formula:

HSY  [VII]

wherein SY has the same meaning as defined above, by heating to a temperature of not more than 300° C., or by reacting a compound having the following general formula:

$R \cdot Sn(X)_3$  [VIII]

with compound having the general formula:

MSY  [IX]

MSR'COOM  [X]

wherein X represents a halogen atom, M represents an alkali metal, and SY and R' have the same meanings as defined above, at a temperature of not more than 100° C., and further reacting the resulting compound having the following general formula:

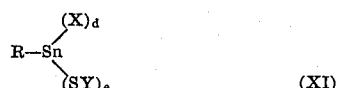

wherein R, X and SY have the same meanings as defined above, and d and e represent integers of 1 or 2, with at least one of caustic alkalis and alkali metal sulfides at a temperature of not more than 100° C.

The organo-tin compound is very excellent as stabilizers for plastic owing to its non-toxicity.

2 Claims, No Drawings

NOVEL ORGANO-TIN COMPOUNDS

This invention relates to novel and useful organo-tin compounds, and more particularly to organo-tin compounds obtained by reacting at least one of compounds having the following general formula:

 (I)

or

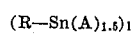 (II)

wherein R represents an alkyl group, alkenyl group or aralkyl group having one to 18 carbon atoms, these groups being able to contain substituent groups, A represents a sulfur atom and $l$ represents a mean degree of polymerization of any number of at least 2, with at least one compound selected from the group consisting of monoorgano-tin compounds having the following general formula:

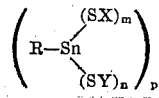 (III)

wherein R has the same meaning as defined above, SX represents a group of mercaptan residue, or a group of the following general formula:

$$-SR'COOR'' \quad [IV]$$

(wherein R' represents an alkylene group, cycloalkylene group, alkenylene group and phenylene group having one to eight carbon atoms, these groups being able to contain substituent groups, R'' represents a hydrogen atom or an alkyl group, cycloalkyl group, alkenyl group or aralkyl group, these groups being able to contain substituent groups), SY represents a group of said SX or a group of the following general formula:

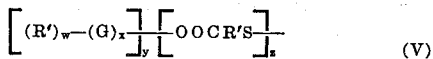 (V)

(wherein R' has the same meaning as defined above, G represents an oxygen atom, sulfur atom, carbon atom or a methylidyne group, w represents an integer of 1 to 4, x represents an integer of 0 or 1, y represents an integer of 1 to 8 and z represents an integer of 2 to 4) or a group of the following general formula:

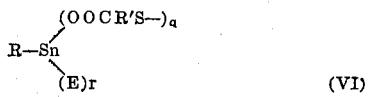 (VI)

(wherein R has the same meaning as defined above, E represents a group of said SX or a group of the general formula [V], q represents an integer of 1 to 3 and r represents an integer of 1 or 2), m and n represent integers, where $m + n = 3$, and p represents a mean degree of polymerization of any number of at least 1, and compounds having the general formula:

$$HSY \quad (VII)$$

wherein SY has the same meaning as defined above, in the presence or absence of a solvent by heating to a temperature of not more than 300°C., or by reacting a compound having the following general formula:

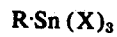 (VIII)

with a compound having the following general formula:

$$MSY \quad (IX)$$

or MSR'COOM (X)

wherein X represents a halogen atom, M represents an alkali metal, and SY and R' have the same meanings as defined above, at a temperature of not more than 100°C., and further reacting the resulting compound having the following general formula:

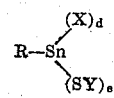 (XI)

wherein R, X and SY have the same meanings as defined above, and d and e represent integers of 1 or 2, with at least one of caustic alkalis and alkali metal sulfides at a temperature of not more than 100°C.

Heretofore, vinyl chloride resins, which will be hereinafter referred to as PVC, have been widely used on account of their excellent physical properties and low cost, but their heat molding processing (for example, extrusion processing, injection molding processing, calender processing, etc.) is not an easy and simple technique owing to the poor heat stability of the resins. Particularly in molding processing of a rigid or semi-rigid polyvinyl chloride resin into sheets, selection of the kind and amount of heat stabilizers is a very important technique.

The now commercially available heat stabilizers can be classified principally into inorganic salts, metallic soaps, and dialkyl tin compounds, and the respective stabilizers are subjected to their proper services according to the use and requirement of the end product. However, all of these stabilizers are not so satisfactory for the production of the sheets of a rigid or semi-rigid polyvinyl chloride resin, which will be referred to as "rigid PVC" or "semi-rigid PVC," and which have been recently in a great demand. In producing sheets of rigid PVC or semi-rigid PVC by calendering, not only the heat stability effect is a property required for the heat stabilizer, but also the adhesion of the sheets to calender rolls, presence of permeation of the heat stabilizer to the surface of the rolls at the kneading operation, which is called "plate-out" or change in appearance of the sheets due to the addition of the heat stabilizer (for example, luster, transparency, presence of foams) is an important criterion for the selection.

Further, it is also necessary to prevent deterioration of physical properties due to the addition of the stabilizer. In this sense, it is necessary to select such a stabilizer that is effective even in a small amount. When the sheets are used as a wrapping material for food or medicine, the presence of toxicity or smells must be carefully investigated. For example, the stabilizers of dibutyl-tin maleates or dibutyl-tin monoalkyl maleates, which are most widely used in the extrusion molding or injection molding, have a large heat stability effect among the commercially available heat stabilizers, and have a good compatibility with PVC. Thus, sheets having a good appearance can be produced therefrom by extrusion processing or press processing, but their adhesion to rolls is considerable in calender processing and thus it is necessary to add a large amount of a lubricant or a releasing agent to the resin. This will impair the appearance of the sheets.

Furthermore, the commercially available stabilizer has a toxic problem, and their addition is not permitted in the most cases when the sheets are used as a wrapping material for food or medicine.

The stabilizers of metal soaps have no adhesion to rolls as seen in the case of the dialkyl tin compound, almost at all, but have a poor heat stability effect. When an increased amount of the stabilizer is added to the resin, for example, more than 1.5 PHR, there is such a drawback that the transparency and luster of the sheets are suddenly lost.

The Cd – Ba composite stabilizer has a high toxicity and cannot be applied to the sheets for wrapping the food or medicine.

As to these stabilizers, it is added that the deterioration of the physical properties due to the addition of these stabilizers is remarkable. For example, the stabilizers of dialkyl tin compounds, which are necessary to add in a relatively large amount to obtain a heat stability effect necessary for the processing, lower the heat softening point of a composition and restrict a practical service temperature range. The stabilizers of metal soaps have a poor compatibility with PVC cause a permeation of the stabilizers to the surfaces of the sheets after the processing to sheets, and impair a sliding between the sheets, resulting in lowering the working efficiency in the processing to sheets.

In the industry of producing sheets of rigid PVC or semi-rigid PVC by calendering, a finding of an effective heat stabilizer has been desired owing to said situation.

The present inventors found, as a result of researches made for a long period of time, that monobutylthiostannoic acid and the polymonobutylthiostannoic acid disclosed in Japanese Patent Publication No. 6137/60 had the most excellent effect among the well-known stabilizers, but had no commercial value, because it was found that any of these monobutylthiostannoic acid and polymonobutylthiostannoic acid generated a strong hydrogen sulfide smell during the production as well as the processing of the sheets, and the metal constituting an apparatus was corroded when used for a long period of time.

On the other hand, the present inventors have found that the present compounds are effective for producing a PVC composition, particularly for producing sheets of rigid PVC or semi-rigid PVC by calender rolls and can overcome the heretofore encountered problems.

By using the stabilizer of the present invention even in a small amount, heat stability of the PVC sheets can be obtained, and the non-toxicity of the present stabilizer is also a great feature of the present invention. The present stabilizer can be added, alone or in admixture of at least two kinds of the present stabilizers, to PVC.

Mole ratio of reactants in producing the present compounds can be freely changed. That is to say, on presuming [R—Sn (A)$_{1.5}$] of the organo-tin compound represented by the general formula [I] or [II] as a unit and calculating it as one mole, the mole ratio of mercaptan, a mercapto acid and/or its ester alone or in admixture as a reactant on one hand to the organo-tin compound as another reactant on the other hand can be freely changed between 1 and 0.1 mole. Further, the amount of a compound represented by said general formula [I] or [II] alone or in admixture as a reactant on one hand to a compound represented by the general formula [III] as another reactant on the other hand can be freely changed between 1 and 99 wt. percent. The reaction temperature is 300°C. or below, preferably 50° to 200°C. The reaction time depends upon the amounts of the reactants, but is usually within 10 hours, preferably 30 minutes to 5 hours.

Further, in producting a compound represented by the general formula [XI] by reacting a compound represented by the general formula [VIII], that is, R·Sn (X)$_3$ with a compound represented by the general formula [IX], that is, MSY, or by the general formula [X], that is, MSR'COOM, the mole ratio of a reactant represented by the general formula [IX] or [X] to another reactant represented by the general formula [VIII] can be freely changed, so long as the ratio can permit stoichiometrically at least one atom of X to be retained in the product [XI], as shown in the general formula [XI]. The reaction temperature is 100°C. or below, preferably −10° to 50°C. In reacting the thus obtained compound represented by the general formula [XI] with a caustic alkali and/or an alkali metal sulfide, the amount of the caustic alkali and/or the alkali metal sulfide should be only more than the necessary amount for allowing one atom of X to be replaced with oxygen or sulfur. The reaction temperature is 100°C or below, preferably −10° to 50°C.

Specific examples of said R are such groups as methyl, ethyl, butyl, isobutyl, octyl, 2-ethylhexyl, octadecyl, aryl, benzyl, phenylethyl, etc.

Examples of mercaptans, mercapto acids and/or their esters are such mercaptans as octylmercaptan, laurylmercaptan, benzylmercaptan, thiophenol, nonylthiophenol, etc., such mercapto acids as thiogylcolic acid, thiopropionic acid, thiolactic acid, thiosalicylic acid, 2-mercapto-lauric acid, etc. and esters of these mercapto acids with such monohydric or polyhydric alcohols as butyl alcohol, octyl alcohol, 2-ethylhexyl alcohol, decyl alcohol, octadecyl alcohol, ethylene glycol, propylene glycol, pentaerythritol, benzyl alcohol, phenethyl alcohol, cinnamyl alcohol, etc.

Likewise, specific examples of SX are groups of such alkylmercaptan residues as octylmercaptan residue, laurylmercaptan residue, etc., or groups of ester residues of alkyl, alkenyl, aralkyl, cycloalkyl, etc. of thioglycolic acid, thiopropionic acid, mercaptobenzoic acid, etc., for example, butyl thioglycolate, octyl thioglycolate, cyclohexyl thioglycolate, allyl thioglycolate, cinnamyl thioglycolate, benzyl thioglycolate, octyl thiopropionate, etc.

Specific examples of SY are the same groups as SX or groups of dihydric to tetrahydric alcohol ester residues of thioglycolic acid, thiopropionic acid, mercaptobenzoic acid, etc., for example, ethylene glycol ester, tripropylene glycol ester, glycerine ester, neopentaerythritol ester, etc. of thioglycolic acid, or thiopropionic acid, or groups of residues of monoorgano-tin compounds of thioglycolic acid or thiopropionic acid as represented by the general formula [VI].

The thus obtained organo-tin compounds of the present invention are very excellent as stabilizers for plastic owing to their non-toxicity.

The solvents used in the present invention include organic solvents having a boiling point of 300°C. or lower, such as straight or branched, saturated or unsaturated hydrocarbons, aromatic hydrocarbons, heterocyclic hydrocarbons, alcohols, ester, ketones and these compounds substituted by a halogen or halogens.

The caustic alkalis used in the present invention include hydroxides of alkali metals, such as Na, K, etc., and the alkali metal sulfide used in the present invention include sulfides and hydrosulfides of alkali metals, such as Na, K, etc.

The present invention will be now explained in detail with reference to examples, but will not be limited to these examples. In the Examples, all parts and percentages used are by weight.

EXAMPLE 1

When 44.7 g. of powdered thiobis (monobutyl-tin sulfide) [(Bu·Sn·S)$_2$ S] was reacted by heating, with 40.8 g. of 2-ethylhexyl thioglycolate (HSCH$_2$COO iso-Oct) in benzene under reflux, reaction proceeded, generating hydrogen sulfide gas. When the generation of hydrogen sulfide was stopped, the benzene was distilled off under a reduced pressure, whereby a colorless, transparent liquid of a low viscosity was obtained. The thus obtained product was a compound having the following structural formula and its tin content was 28.7 percent, which was in good accordance with the theoretical value (28.8 percent):

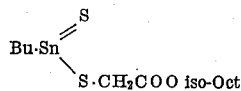

Note: In the specification 2-ethylhexyl group and butyl group are referred to as "iso-Oct" and "Bu," respectively.

EXAMPLE 2

When 44.7 g. of powdered thiobis (monobutyl-tin sulfide) [(Bu·Sn·S)$_2$ S] was reacted, by heating, with 25.4 g. of diethylene glycol bisthioglycolate (HS·CH$_2$C OO CH$_2$ CH$_2$ OCH$_2$ CH$_2$ —OOC CH$_2$ SH) in toluene under reflux, reaction proceeded, generating hydrogen sulfide gas. When the generation of hydrogen sulfide was stopped, tobuene was distilled off under a reduced pressure, whereby a colorless, transparent liquid was obtained. The thus obtained product was a compound having the following structural formula, and its tin content was 35.6 percent, which was in good accordance with the theoretical value (35.5 percent).

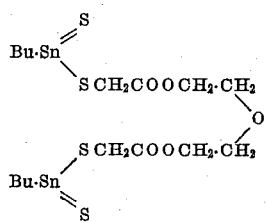

EXAMPLE 3

When 89.5 g. of bis (monobutyl-tin sulfide) oxide [(Bu·SnS)$_2$ 0] was reacted, by heating, with 43.3 g. of pentaerythritol tetrakisthioglycolate [C(CH$_2$·OOC·CH$_2$—SH)$_4$] in toluene under reflux, reaction proceeded, generating water. When the generation of water was stopped, toluene was distilled off under a reduced pressure, whereby a colorless, transparent, viscous liquid was obtained. The thus obtained product was a compound having the following structural formula, and its tin content was 37.5 percent which was in good accordance with the theoretical value (37.7 percent):

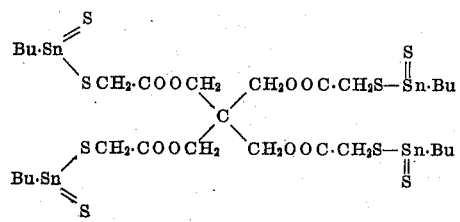

EXAMPLE 4

When 52.8 g. of thiobis (octyl-tin sulfide) [(Oct·Sn·S)$_2$ S] together with 40.4 g. of laurylmercaptan was stirred in the absence of a solvent by heating to 100°C., reaction proceeded, generating hydrogen sulfide gas. When the reaction was continued by heating until the generation of hydrogen sulfide had been stopped, a slightly yellowish, transparent liquid was obtained. The thus obtained product had the following structural formula and its tin content was 25.6 percent, which was in good accordance with the theoretical value (25.5 percent)

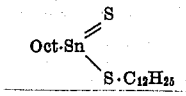

Note: In the specification, an N - octyl group is referred to as "Oct."

EXAMPLE 5

When 44.7 g. of poly (thiostannoic acid) {[·Bu·Sn·(S)$_{1.5}$]$_t$} was reacted, by heating, with 9.2 g. of thioglycolic acid in toluene, reaction proceeded, generating hydrogen sulfide. When the generation of hydrogen sulfide was stopped, toluene was distilled off under a reduced pressure, whereby a slightly yellowish, amorphous, gel-state compound was obtained. The thus obtained product had an unidentified structure, but could be presumed as a compound constituting a portion of poly (thiostannoic acid), whose —S— bond was replaced with the —S·CH$_2$—COO— bond.

EXAMPLE 6

20.9 g. of monobutylstannoic acid

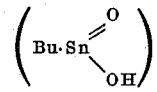

and 61.2 g. of 2-ethylhexylthioglycolate were subjected to dehydration reaction in benzene under reflux by heating. After the completion of the dehydration reaction, 44.7 g. of powdered thiobis (monobutyl-tin sulfide) was added further thereto, and reaction was carried out by heating under reflux for 1 hour. The, by distilling off benzene under a reduced pressure, 75.5 g. of a slightly yellowish liquid was obtained. The thus obtained product could be presumed as a mixture of:

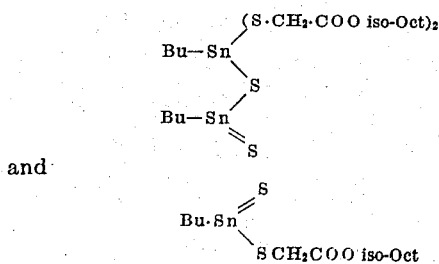

and a compound having the following structural formula:

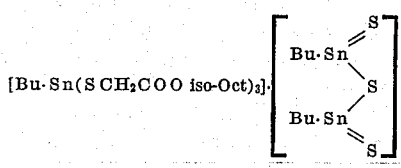

The Sn content and S content thereof were 29.0 percent and 15.7 percent, respectively, which were in good accordance with the theoretical values (Sn = 29.3 %, S = 15.9 %).

EXAMPLE 7

41.8 g. of monobutylstannoic acid

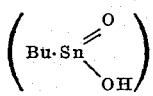

and 76.2 g. of diethyleneglycol glycolate (H·S·CH₂COO·CH₂CH₂—O·CH₂·CH₂·OOC·CH₂·SH) were subjected to dehydration reaction in benzene under reflux by heating, and after the completion of the dehydration reaction, 44.7 g. of thiobis (monobutyl-tin sulfide) was further added thereto. The reaction was carried out by heating under reflux for 1 hour, and then by distilling off benzene under a reduced pressure, 155 g. of a slightly yellowish liquid was obtained.

The thus obtained product could be presumed as the following compounds:

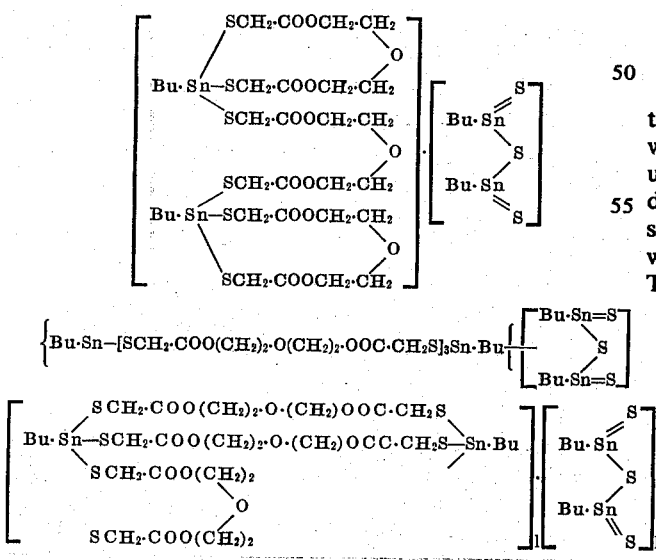

The Sn content and S content of these compounds were 30.3 percent and 18.3 percent respectively, and were in good accordance with the theoretical values (Sn = 30.6 %, S = 18.5 %).

EXAMPLE 8

20.9 g. of monobutylstannoic acid

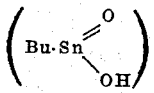

20.2 g. of laurylmercaptan and 34.8 g. of cyclohexylthioglycolate were subjected to dehydration reaction in benzene under reflux by heating, and after the completion of the dehydration reaction, 44.7 g. of thiobis (monobutyl-tin sulfide) was further added thereto. The reaction was carried out by heating under reflux for 1 hour. Then, by distilling off benzene under a reduced pressure, 117 g. of a slightly yellowish liquid was obtained. The thus obtained product was found to be a mixture of:

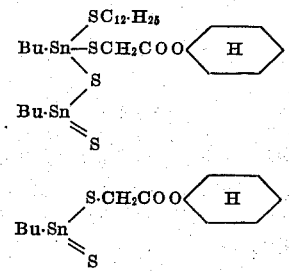

and

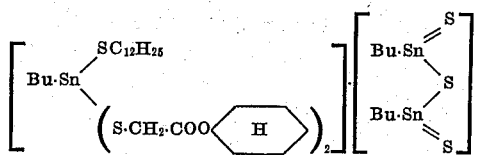

or a compound having the following structural formula:

Note: In the specification, a cyclohexyl group is referred to as

"⬡H".

EXAMPLE 9

20.9 g. of mobobutylstannoic acid, 27.4 g. of dodecyl thiopropionate, and 18.2 g. of benzyl thioglycolate were subjected to dehydration reaction in benzene under reflux by heating, and after the completion of the dehydration reaction, 44.7 g. of thiobis (monobutyl-tin sulfide) was further added thereto, and the reaction was carried out by heating under reflux for 1 hour. Then, by distilling off benzene under a reduced pressure, 62.5 g. of a slightly yellowish liquid was obtained. The thus obtained product was found to be a mixture of:

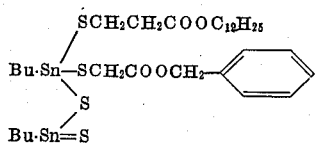

and

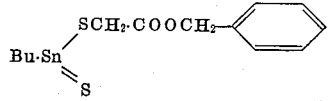

or a compound having the following structural formula:

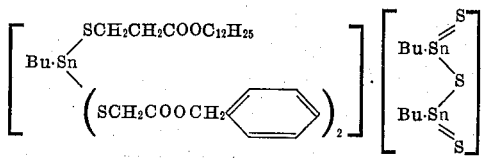

The Sn content and S content thereof were 32.9 percent and 17.5 percent, respectively and were in good accordance with the theoretical values (Sn = 33.1 %, S = 17.8 %).

EXAMPLE 10

52.9 g. of monooctylstannoic acid

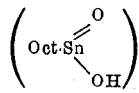

and 27.6 g. of thioglycolic acid were subjected to dehydration reaction in benzene under reflux by heating, and after the completion of the reaction, 44.7 g. of thiobis (monobutyl-tin sulfide) was further added thereto, and the reaction was further carried out by heating under reflux for 1 hour. Then, by distilling off benzene under a reduced pressure, 73 g. of a slightly yellowish, viscous liquid was obtained. The thus obtained liquid was solidified in an amorphous state while kept stored.

The thus obtained product could be presumed as a compound of the following type, and its Sn content and S content were 40.1 percent and 16.0 percent, respectively and were in good accordance with the theoretical values (Sn = 40.3 %, S = 16.3 %).

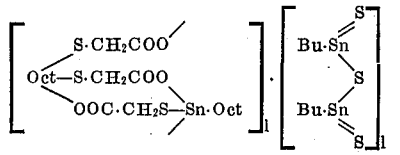

EXAMPLE 11

24.3 g. of monobenzylstannoic acid

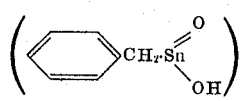

and 61.2 g. of 2-ethylhexyl thioglycolate were subjected to dehydration reaction in benzene under reflux by heating, and after the completion of the reaction, 40.5 g. of powdered thiobis (monoallyl-tin sulfide) [(CH$_2$ = CH — CH$_2$ SnS)$_2$S] was further added thereto and the reaction was further carried out by heating under reflux for 1 hour. Then, by distilling off benzene under a reduced pressure, 122.4 g. of a slightly yellowish liquid was obtained. The thus obtained product could be presumed to be a mixture of:

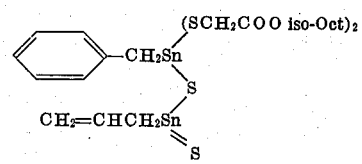

and

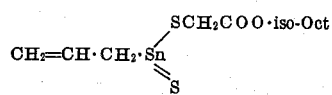

or a compound of the following type:

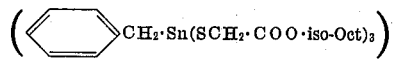

Its Sn content and S content were 29.0 percent and 15.5 percent respectively and were in good accordance with the theoretical values (Sn = 29.1 %, S = 15.7 %).

EXAMPLE 12

128.3 g. of monolaurylstannoic acid

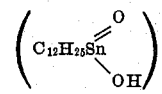

and 129.6 g. of pentaerythaitol tetrakis thioglycolate

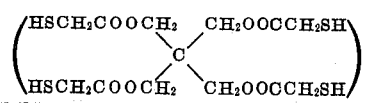

were subjected to dehydration reaction in benzene under reflux by heating, and after the completion of the reaction, 44.7 g. of thiobis (monobutyltin sulfide) was further added thereto, and the reaction was further carried out by heating under reflux for 2 hours. Then, by distilling off benzene under a reduced pressure, 288 g. of a slightly yellowish, amorphous solid was obtained. The thus obtained product could be presumed as a compound having the following structural formula, and its Sn content and S content were 24.6 percent and 16.5 percent and were in good accordance with the theoretical values (Sn = 24.7 %, S = 16.7 %).

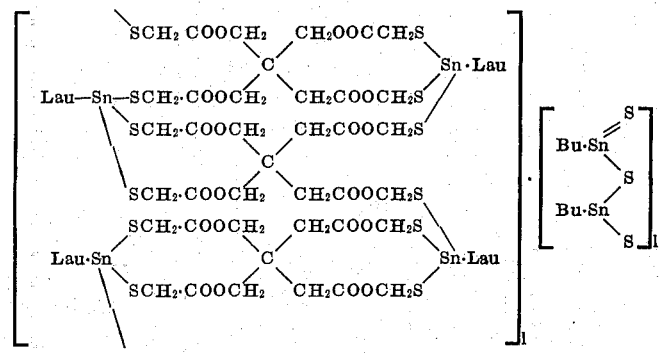

EXAMPLE 13

167.2 g. of monobutylstannoic acid, 60 g. of mercaptobenzoic acid

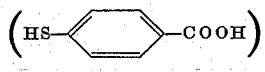

and 168 g. of ethylene glycol thioglycolate (HS·CH$_2$·COOCH$_2$CH$_2$OOC·CH$_2$·SH) were subjected to dehydration reaction in benzene under reflux by heating, and after the completion of the dehydration reaction, 22.4 g. of monobutyl-tin sulfide polymer {[Bu·Sn(S)$_{1.5}$]$_l$} was further added thereto, and the reaction was carried out by heating under reflux for 1 hour. Then, by distilling off benzene under a reduced pressure, 388.5 g. of a slightly yellowish liquid was obtained. The thus obtained product could be presumed as a compound having the following structural formula and its Sn content and S content were 27.5 percent and 16.5 percent, respectively.

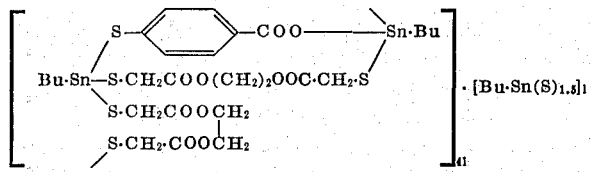

EXAMPLE 14

20 g. of an aqueous 20 percent caustic soda solution was added to 400 ml. of a methanol solution containing 20.4 g. of 2-ethylhexyl ester of thioglycolic acid while cooling the methanol solution with water, and then an aqueous methanol solution containing 28.2 g. of monobutyl-tin trichloride was added thereto dropwise while further cooling and keeping the solution at a temperature of 0° to 5°C. After the completion of the dropwise addition, the reaction was continued with stirring at 5° to 10°C. for 30 minutes, and then the solution was again cooled to 0° to 5°C. An aqueous 10 percent solution containing 8 g. of Na$_2$S was further added thereto dropwise and subjected to reaction. Then, 50 ml. of toluene was added thereto at a temperature of 10° to 30°C. and further 100 ml. of water was added thereto, whereby the reaction solution was separated into two layers. After the separation of the layers, by distilling off toluene from the toluene layer under a reduced pressure, 40 g. of a slightly yellowish, transparent liquid was obtained. Its tin content was 28.4 percent.

EXAMPLE 15

The respective stabilizers as shown in Table 1 were added to commercially available PVC of $\bar{p} = 800$ produced by a suspension polymerization process, and after kneading the mixture by 6-inch rolls and molding it to sheets, the sheets were left at 180°C. in a Geer-type aging tester to observe the incipient coloring and the time till blackening at an interval of 5 minutes. As necessary lubricants for the kneading, 1.0 part of stearic acid and 0.2 part of low molecular weight polyethylene were added thereto.

TABLE 1

| Blend No. | Kind of Stabilizer | amount added* | incipient coloring | blackening time (mm.) |
|---|---|---|---|---|
| 1 | Present product, Type [IX]** | 0.5 | hardly yellowish | 50 |
| 2 | Present product, Type [X]*** | " | " | 55 |
| 3 | Present product, Type [XI]**** | " | " | 45 |
| 4 | Present product, Type [IV]***** | " | " | 40 |
| 5 | di-octyl tin maleate (commercially avail) | " | slightly yellowish | 40 |
| 6 | di-butyl tin maleate (commercially avail) | " | " | 45 |
| 7 | di-butyl tin mercaptide (commercially avail) | " | " | 45 |
| 8 | Liquid Cd-Ba Composite stabilizer (commercially avail) | 10 | considerably yellowish | 30 |
| 9 | Powdered Cd-Ba Composite stabilizer (commercially avail) | " | slightly yellowish | 35 |
| 10 | Polymonobutylthiostannoic acid | 0.5 | slightly dark yellow | 55 |
| 11 | Polymonobutylstannoic acid | " | considerably dark yellow | 25 |
| 12 | Ca-Zn organic composite stabilizer | 1.0 | slightly yellow | 20 |
| 13 | Di-octyl tin mercaptide (commercially avail) | 0.5 | slightly yellow | 45 |
| 14 | Co-condensate of butylstannoic acod and polybutylstannoic acid(1 : 2) | " | Considerably dark yellow | 30 |

Note: * Number of parts to 100 parts of PVC resin

** [BuSn(SCH₂COOiso-Oct)₃]·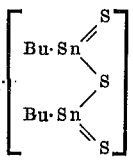

iso-Oct = 2-ethylhexyl group
Bu = butyl group

*** 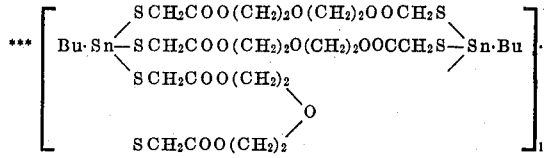

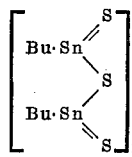

"l" shows the degree of polymerization of at least 1.

**** 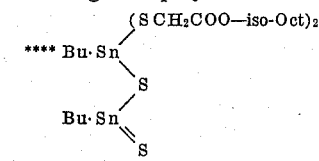

***** a mixture of

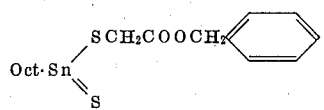

and

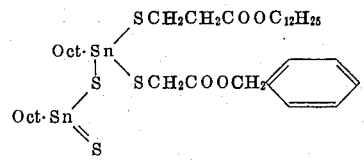

EXAMPLE 16

Each blend of said Example 15 was tried to make a sheet therefrom by means of an inversed L-type calender rolls of 14-inch diameter. As a result, blends Nos. 5, 6, 7, 8 and 13 containing commercially available stabilizers of tin system adhered to the calender rolls immediately after the blends were supplied to the calender rolls, and could not be made in sheets.

Further, in order to prevent the sheets from adhesion to the calender rolls, the amount of the lubricant was increased (1.5 parts of stearic acid and 0.7 part of low molecular weight polyethylene), but the adhesion took place about 20 minutes after the supply of the blends, and the resulting sheets were white turbid owing to the increased amount of the lubricant.

From blends Nos. 1, 2, 3 and 4 containing the stabilizers of the present invention as shown in Table 1, very excellent calender sheets could be continuously made.

Sheets could be made from blends Nos. 8 and 9, but the resulting sheets, were considerably yellowish (particularly blend No. 8) and were poor also in the transparency.

In the sheet prepared from blend No. 9 of Table 1, dispersion of fine foams was observed.

Blend No. 10 of Table 1 gave a good calender processability next to the blends containing the present stabilizer and a sheet having excellent appearance, but scattering of small fisheyelike defects was observed on the resulting sheet. Considerable hydrogen sulfide smalls were generated during the processing and it was difficult to carry out a continuous, long run operation.

Likewise, blends Nos. 11, 12 and 14 of Table 1 underwent thermal decomposition at a resin holding part between rolls, which was called "bang," during the continuous operation, and contamination of the sheet with blackened matters was observed.

EXAMPLE 17

Several kinds of copolymers consisting principally of vinyl chloride, and mixtures of the so-called polymer-reinforcing agent, for example, commercially available acrylonitrile-butadiene-styrene copolymer (which is called "ABS") or methylmethacrylate-butadiene-styrene copolymer (which is called "MBS") with a vinyl chloride polymer were subjected to heat resistance test (temperature 170°C.) by means of a Geer aging tester to investigate the incipient coloring and blackening time.

The results are given in Table 2. As the stabilizers 0.5 part of Type [IX] of Table 1 and 1.0 part of the commercially available Cd–Ba composite stabilizer for the comparison sake were used. The lubricant of Example 15 was used in the same manner as in Example 15.

TABLE 2

| Blend No. | Resin Composition | Other resin content | stabilizer | incipient coloring | blackening time (min.) |
|---|---|---|---|---|---|
| 1 | V-VAC copolymer ($\bar{p}=760$) | VAC 5% | Present stabilizer type [IX] | Made hardly yellowish | 55 |
| 2 | " | " 10% | " " | " " | 40 |
| 3 | " | " 5% | Cd-Ba composite stabilizer | " " | 35 |
| 4 | " | " 10% | " " | " " | 25 |
| 5 | Mixture of PVC ($\bar{p}=760$) and MBS | VAC 5% | Present stabilizer Type [IX] | Made hardly yellowish | 60 |
| 6 | " | " 15% | " " | " " | 70 |
| 7 | " | " 30% | " " | " " | 75 |
| 8 | " | " 5% | Cd-Ba composite stabilizer | Slightly yellowish | 40 |
| 9 | " | " 15% | " | " Brown | 30 |
| 10 | " | " 30% | " | " Dark brown | 25 |

EXAMPLE 18

Blend Nos. 2 and 9 of Table 2 were selected and sheets were made therefrom in the same manner as in Example 16. The thus obtained sheets had an excellent gloss and transparency and could be used effectively as wrapping material. Further, it was found that the calender operation was effected very easily, and no hydrogen sulfide smell or no scattering of fisheye-like defects as in the use of polybutyl-thiostannoic acid were observed at all.

EXAMPLE 19

One of the features of the heat stabilizers of the present invention is that the present stabilizer is effective even in a small amount, as compared with the well-known stabilizers. As specific examples, the cases of sheet preparation by calender are given in Table 3. The present stabilizer, Type [IX] of Table 1 and a commercially-available, liquid Cd-Ba composite stabilizer, for the comparison sake were used. The same calender rolls and the compositions except the stabilizers were used as in Example 16.

TABLE 3

| Kind of stabilizer | Amount of stabilizer | Degree of incipient coloring of sheet | Calender processability |
|---|---|---|---|
| Present stabilizer Type [IX] | 0.02 | Made strongly yellowish | Thermal decomposition was observed during the calendering |
| " | 0.03 | " | Good |
| " | 0.05 | " | " |
| " | 0.1 | " | " |
| " | 0.3 | " | " |
| " | 0.5 | " | " |
| " | 0.7 | No difference almost at all | " |
| " | 1.0 | " | " |
| " | 1.2 | " | Slight plate-out was observed on calender rolls |
| Liquid Cd-Ba composite stabilizer | 1.0 | Made strongly yellowish | Good, but the sheet was made slightly white turbid |
| " | 1.5 | Made slightly yellowish | Good, but the sheet was made strongly white turbid |

We claim:

1. An organo-tin compound obtained by reacting at least one of the compounds having the formula:

(I)

or

[R—Sn(S)₁.₅]₁   (II)

wherein R is an alkyl, alkenyl or aralkyl of one to 18 carbon atoms, these groups being able to contain substituent groups, and represents a mean degree of polymerization of at least 2, with at least one compound selected from the group consisting of mono-organo-tin compound having the formula

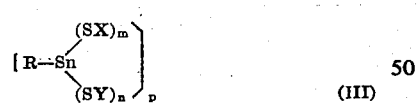

(III)

wherein R has the same meaning as defined above, SX is a merapto residue or a group of the formula

— SR′ COOR″   (IV)

wherein R′ is alkylene, cycloalkylene, alkenylene or phenylene of one to eight carbon atoms, these groups being able to contain a $C_1$ — $C_2$ alkyl group, and R″ is hydrogen, alkyl, cycloalkyl, alkenyl or aralkyl, these groups being able to contain chlorine or a $C_1$ — $C_9$ alkyl group, SY is a group of SX or a group of the formula:

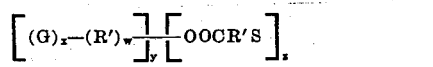

wherein R′ has the same meaning as defined above; G is oxygen, sulfur, carbon or methylidyne; w is an integer of 1 – 4; x is an integer of 0 or 1; y is an integer of 1 – 8; and z is an integer of 2 – 4, or a group of the formula

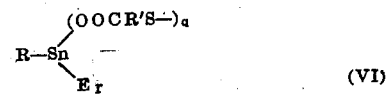

(VI)

wherein R and R′ have the same meanings as defined above, E is a group of said SX or a group of the formula [V], q is an integer of 1 – 3 and r is an integer of 1 – 2, m and n are integers such that m + n = 3, and p represents a mean degree of polymerization of at least 1.

2. A process for producing an organo-tin compound which comprises reacting at least one of the compounds having the following formula:

(I)

or

[R—Sn(S)₁.₅]₁   (II)

wherein R is an alkyl, alkenyl or aralkyl of one to 18 carbon atoms, these groups being able to contain substituent groups, and l represents a mean degree of polymerization of at least 2, with at least one compound selected from the group consisting of mono-organo-tin compounds having the formula

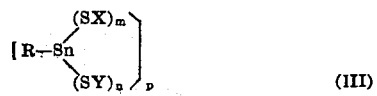

(III)

wherein R has the same meaning as defined above, SX is a merapto residue or a group of the formula

—SR′ COOR″   (IV)

wherein R′ is alkylene, cycloalkylene, alkenylene or phenylene of one to 8 carbon atoms, these groups being able to contain chlorine or a $C_1$ — $C_9$ alkyl group, and R″ is hydrogen, alkyl, cycloalkyl, alkenyl or aralkyl, these groups being able to contain chlorine or a $C_1$ — $C_9$ alkyl group, SY is a group of SX or a group of the formula:

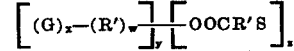

where R′ has the same meaning as defined above; G is oxygen, sulfur, carbon or methylidyne; w is an integer of 1 – 4; x is an integer of 0 or 1; y is an integer of 1 – 8; and z is an integer of 2 – 4, or a group of the formula

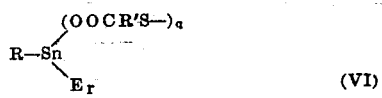

(VI)

wherein R and R′ have the same meanings as defined above, E is a group of said SX or a group of the formula [V], q is an integer of 1 – 3 and r is an integer of 1 – 2, m and n are integers such that m + n = 3, and p represents a mean degree of polymerization of at least 1.

* * * * *

UNITED STATES PATENT OFFICE
CERTIFICATE OF CORRECTION

Patent No. 3,697,566          Dated October 10, 1972

Inventor(s) ATSUO SASSA,: MASUO YUKUTOMI,: HIROTOSHI SHINKAWA,: TUNEO MORIYA and KEISUKE HOMMA It is certified that error appears in the above-identified patent and that said Letters Patent are hereby corrected as shown below:

Column 1, lines 8 and 9, Sumitomo Bakelite Company

Limited, Tokyo, Japan

Signed and sealed this 24th day of April 1973.

(SEAL)
Attest:

EDWARD M. FLETCHER, JR.          ROBERT GOTTSCHALK
Attesting Officer          Commissioner of Patents